(12) United States Patent
Pino et al.

(10) Patent No.: US 6,963,829 B1
(45) Date of Patent: Nov. 8, 2005

(54) METHOD AND APPARATUS FOR INTERFACING A SPECTRUM DIGITAL INCORPORATED TMS470 EVALUATION BOARD WITH A SPECTRUM DIGITAL INCORPORATED TMS320LC54X EVALUATION BOARD

(75) Inventors: Angel Pino, Malden, MA (US); Paul Dryer, Andover, MA (US); Michael S. McCormack, Gloucester, MA (US)

(73) Assignee: 3Com Corporation, Santa Clara, CA (US)

( * ) Notice: Subject to any disclaimer, the term of this patent is extended or adjusted under 35 U.S.C. 154(b) by 1004 days.

(21) Appl. No.: 09/779,353

(22) Filed: Feb. 8, 2001

(51) Int. Cl.[7] ............................................. G06F 9/455
(52) U.S. Cl. ............................ 703/25; 703/23; 703/24; 712/32; 712/35; 712/38
(58) Field of Search ............................. 703/23, 24, 25; 712/32, 35, 38

(56) References Cited

U.S. PATENT DOCUMENTS

| | | | | |
|---|---|---|---|---|
| 5,594,890 A | * | 1/1997 | Yamaura et al. .............. | 703/23 |
| 5,953,516 A | * | 9/1999 | Bonola .......................... | 703/24 |
| 6,179,489 B1 | * | 1/2001 | So et al. ....................... | 718/102 |
| 6,434,690 B1 | * | 8/2002 | Ohsuga et al. ................ | 712/35 |

* cited by examiner

*Primary Examiner*—Thai Phan
*Assistant Examiner*—Herng-der Day
(74) *Attorney, Agent, or Firm*—McGlew and Tuttle, P.C

(57) ABSTRACT

A bridge board connects a TMS470 processor evaluation module and a TMS320C54XX processor evaluation module. The bridge board performs translation of signal formats on both of the boards and also synchronizes the signal formats on both boards so that both boards are able to operate together. With this bridge board, and its specific connections to both of the evaluation modules, a single workstation, preferably connected to the TMS470 module is able to not only control the TMS470 module but also the TMS320 module. Software for the TMS320 can be loaded from the workstation through the TMS470 module, through the bridge board and into the TMS320 module. The software in both of the evaluation modules can then operate and interact with each other through the bridge board.

17 Claims, 11 Drawing Sheets

METHOD AND APPARATUS FOR INTERFACING A SPECTRUM DIGITAL INCORPORATED TMS470 EVALUATION BOARD WITH A SPECTRUM DIGITAL INCORPORATED TMS320LC54X EVALUATION BOARD

FIELD OF THE INVENTION

The present invention relates in general to an interface between first and second processor emulating evaluation boards, and more specifically to a bridge board between a TMS470 processor evaluation module and a TMS320C54XX processor evaluation module.

BACKGROUND OF THE INVENTION

Integrated circuits (IC) are well known in the field of electronics and often incorporate millions of individual electronic components onto a single substrate. Designing such IC's with their millions of components and the corresponding millions of connections, can be very time consuming and expensive, as well as the testing of a new design. Therefore it is desirable to reuse existing designs, or portions of existing designs, when designing a new IC.

Different types of circuits have been designed for IC's, which perform a general function. An example of these different types of circuits, are processors, memory devices, programmable logic devices (PLD) and analogue to digital convertors (A/D). These types of circuits are further subdivided into subtypes with different features. The different types of circuits are often formed into individual IC's, mounted on a printed circuit board and connected to each other for a specific application.

More recently, Application Specific Integrated Circuits (ASIC) are being designed where a single substrate contains several different types of circuits in a particular combination which has been designed for a specific application. Existing designs for the different types of circuits are combined into one integrated circuit to make the ASIC. In this way, only the design and testing of the connections between the known types of circuits is necessary, and not the design and testing of all of the individual components of an integrated circuit.

SUMMARY AND OBJECTS OF THE INVENTION

It is a primary object of the present invention to provide an arrangement which emulates the connection between known types of circuits on an integrated circuit, especially between two known types of processor circuits formed into a single integrated circuit.

The present invention particular addresses the problem of emulating the connection between a general purpose processor such as the TMS470 also known as an ARM RISC (Reduced Instruction Set Computer) processor, and a Digital Signal Processor (DSP) such as the Texas Instruments C549DSPs. In telephone equipment, it is very desirable to combine these two processors, or two processors that are similar. These two processors are also combined with other components for applications in a telephone system.

The computer program or computer code that runs on these processors is specifically designed for the application where the ASIC will be used, and for the particular processor that will be incorporated onto the ASIC. Creating an ASIC involves very high initial costs. Masks or templates need to be created with very complicated and small dimensions. Therefore it is desirable to test an ASIC design very thoroughly before expending the effort to create the masks or templates for the actual ASIC. Creating the design and the actual manufacture can take long periods of time. The processors on the ASIC need software and it is desirable to begin creating and testing the software before the actual ASIC is created.

One way to test a proposed ASIC design, and begin creating and testing software for the ASIC, is to simulate the ASIC through a model. Since similar processor designs are used over and over again in ASICs, evaluation boards or emulators have been created to simulate or model the operation of specific processors in an ASIC. An example of these evaluation boards is the Spectrum Digital Incorporated TMS470 evaluation board and the Spectrum Digital Incorporated TMS320LC54X evaluation board. These boards are designed to be connected to a computer workstation where the workstation runs software which emulates the operation of the respective processor in an ASIC. Details of these evaluation modules or boards can be found in the technical reference documents attached as an appendix to this specification and incorporated by reference.

Occasionally two processors are incorporated into one ASIC. Each processor has its own software and in actual operation, the processors communicate with each other to operate on the data. As described above, evaluation boards are available for the individual processors, TMS320 and the TMS470. With these evaluation boards, the respective portions of the ASIC can be tested separately and software can be developed and tested for the respective processors independently. Each of the evaluation modules connect to a software emulator cable in order to operate. A person therefore developing and testing software for an ASIC with two processors must therefore have data transfers between processors go through the two emulator cables and the workstation.

The TMS470 evaluation board has two connectors labeled JP1 and JP2. These connectors connect to data lines, address lines and control lines of the TMS470 evaluation board, and these lines correspond to actual data lines, address lines and control lines of the processor when it is incorporated onto an ASIC. The TMS320 evaluation module also has data lines, address lines and control lines which correspond to actual data lines, address lines and control lines on the actual processor incorporated onto the ASIC.

The present invention connects the two evaluation modules with a bridge board that converts signals from one module into signals that the other module can read. The bridge board performs translation of signal formats on both of the boards and also synchronizes the signal formats on both boards so that both boards are able to operate together.

With this bridge board, and its specific connections to both of the evaluation modules, a single workstation, preferably connected to the TMS470 module is able to not only control the TMS470 module but also the TMS320 module. Software for the TMS320 can be loaded from the workstation through the TMS470 module, through the bridge board and into the TMS320 module. The software in both of the evaluation modules can then operate and interact with each other through the bridge board. A single workstation is thus able to develop and test software for two processors on an ASIC, and the single workstation is also able to test how the software for two processors interacts. The single workstation controlling both evaluation modules and being able to test the software for the individual modules both individually and together, allows the development and testing of the software for a dual processor ASIC to start earlier and greatly reduces the time and effort needed to develop and test the software.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
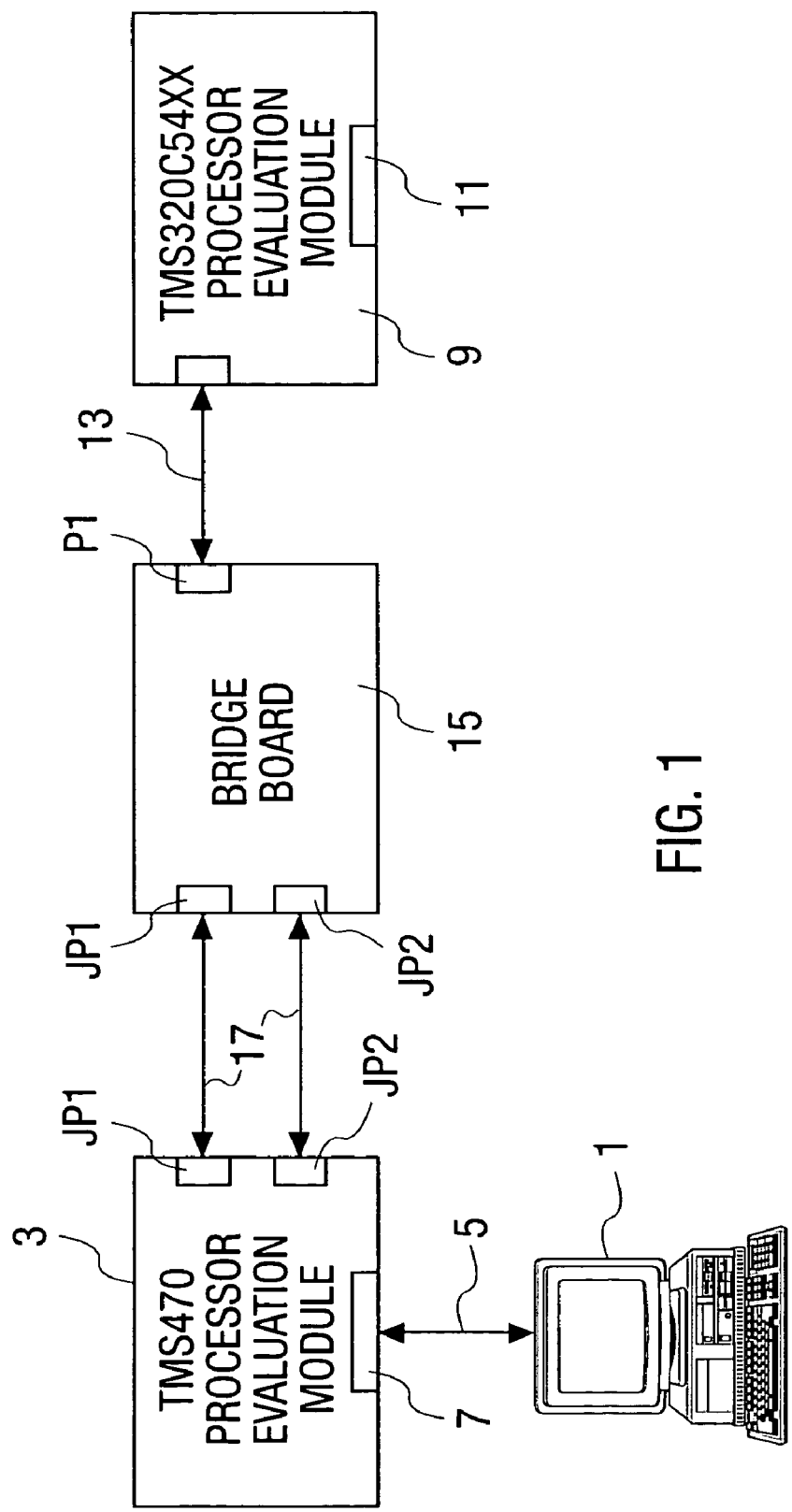
FIG. 1 is a schematic diagram of the emulating arrangement using a bridge board to translate and synchronize between two processor evaluation modules.
Figure 5:
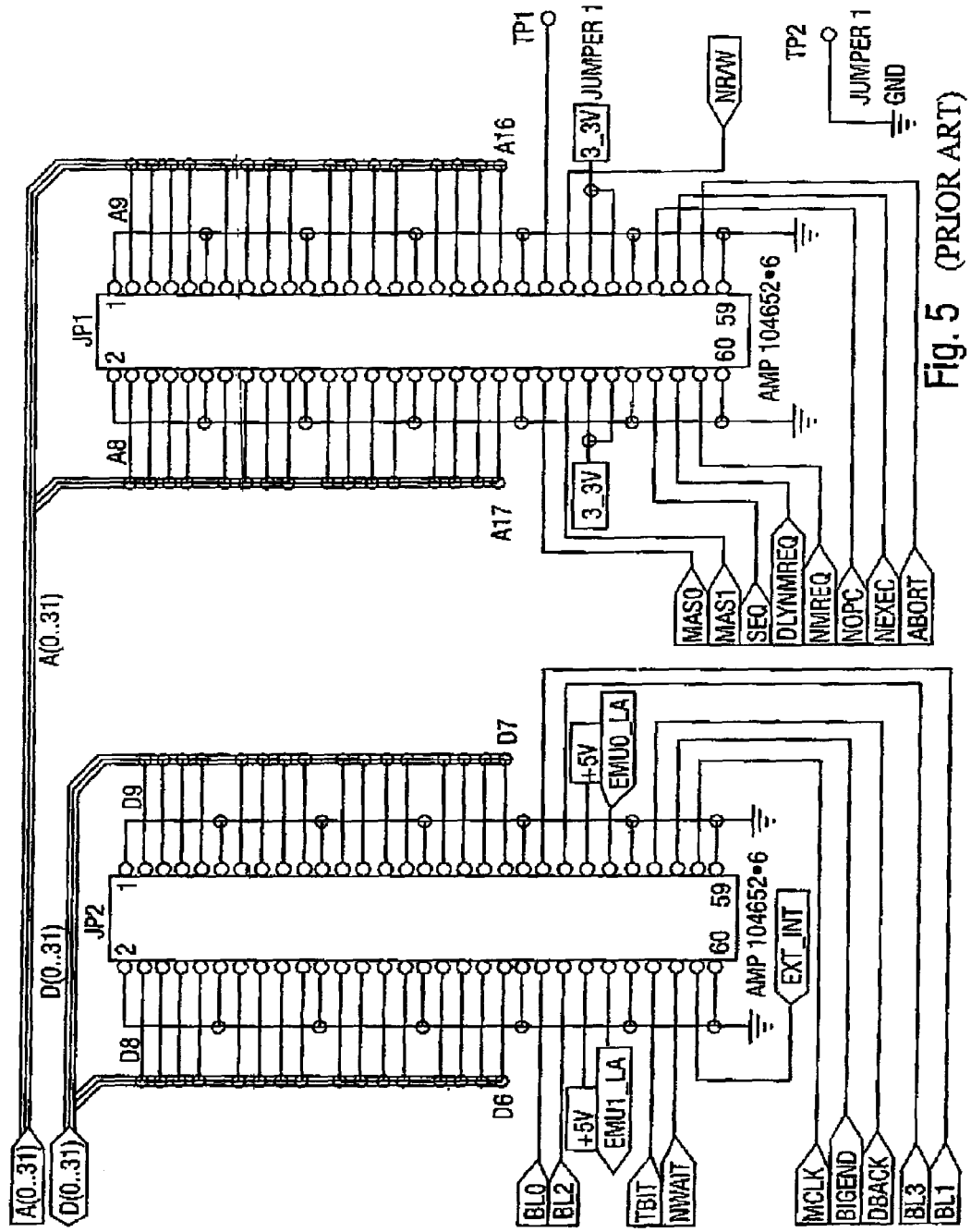
FIG. 5 is a schematic diagram of the connection between the signal lines of the TMS470 module and the JP1 and JP2 connectors.
Figure 6A:
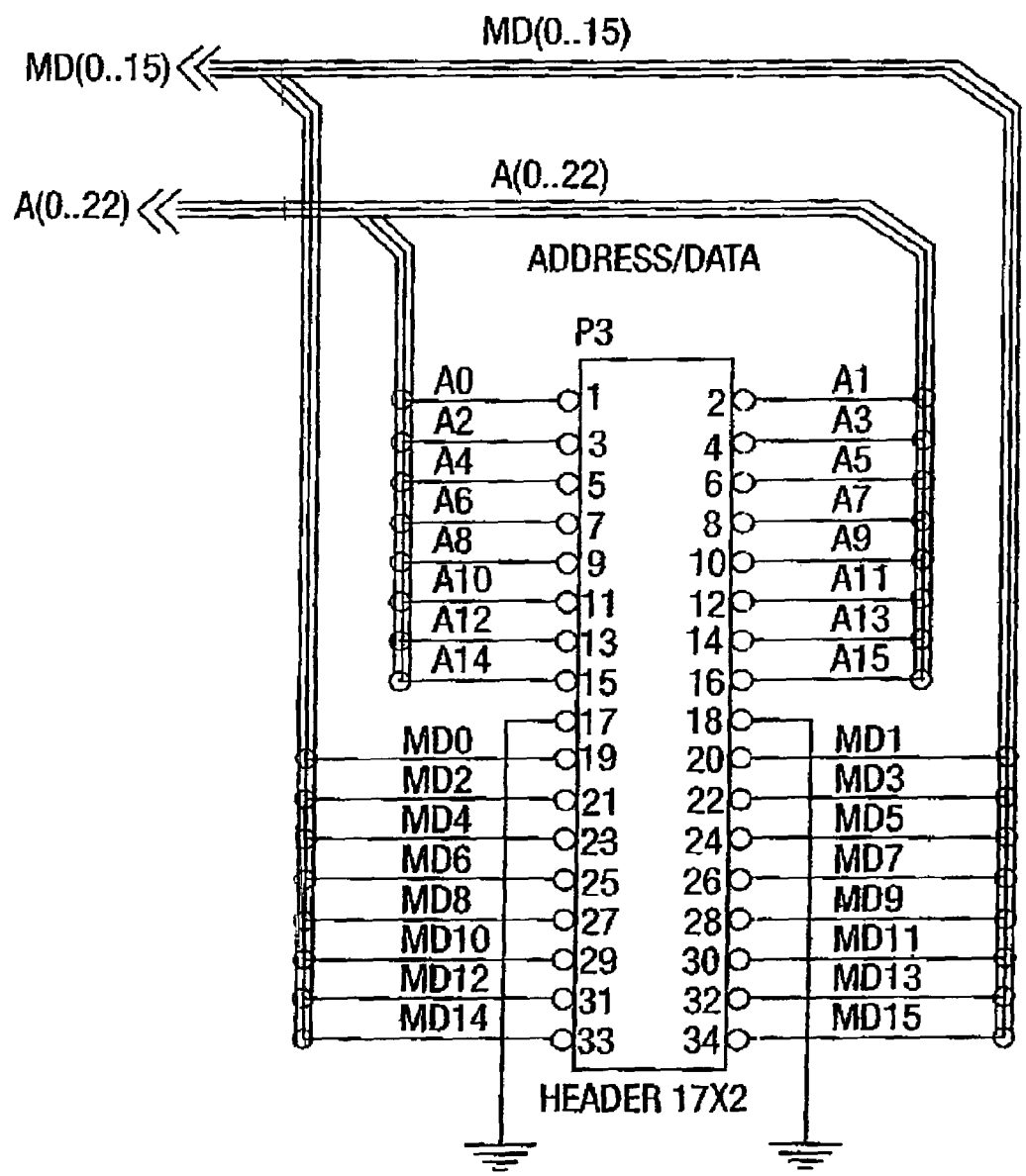
FIG. 6 is a schematic view of the data lines, signal lines and control lines of the TMS320 processor evaluation module.
Figure 6B:
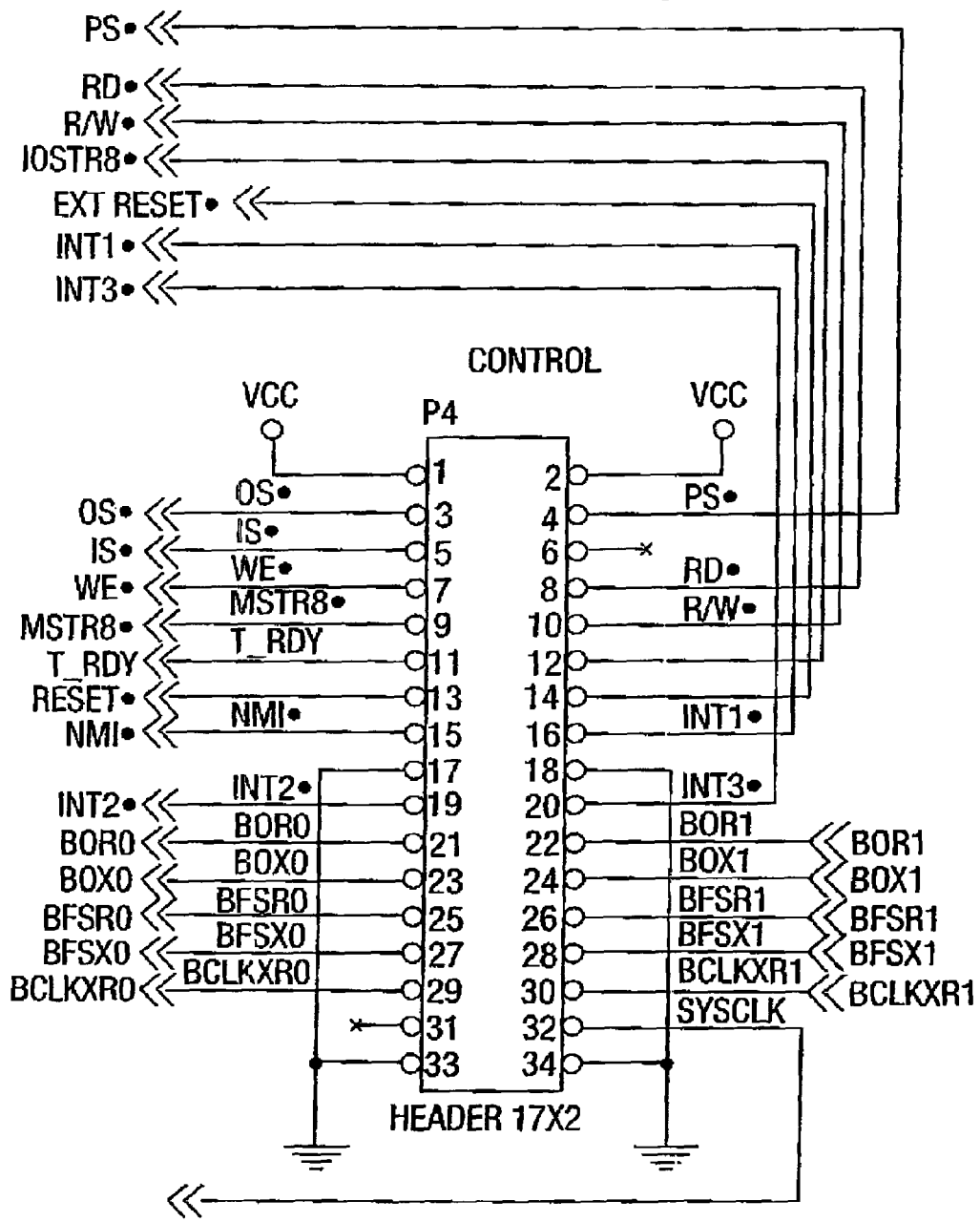
Figure 6C:
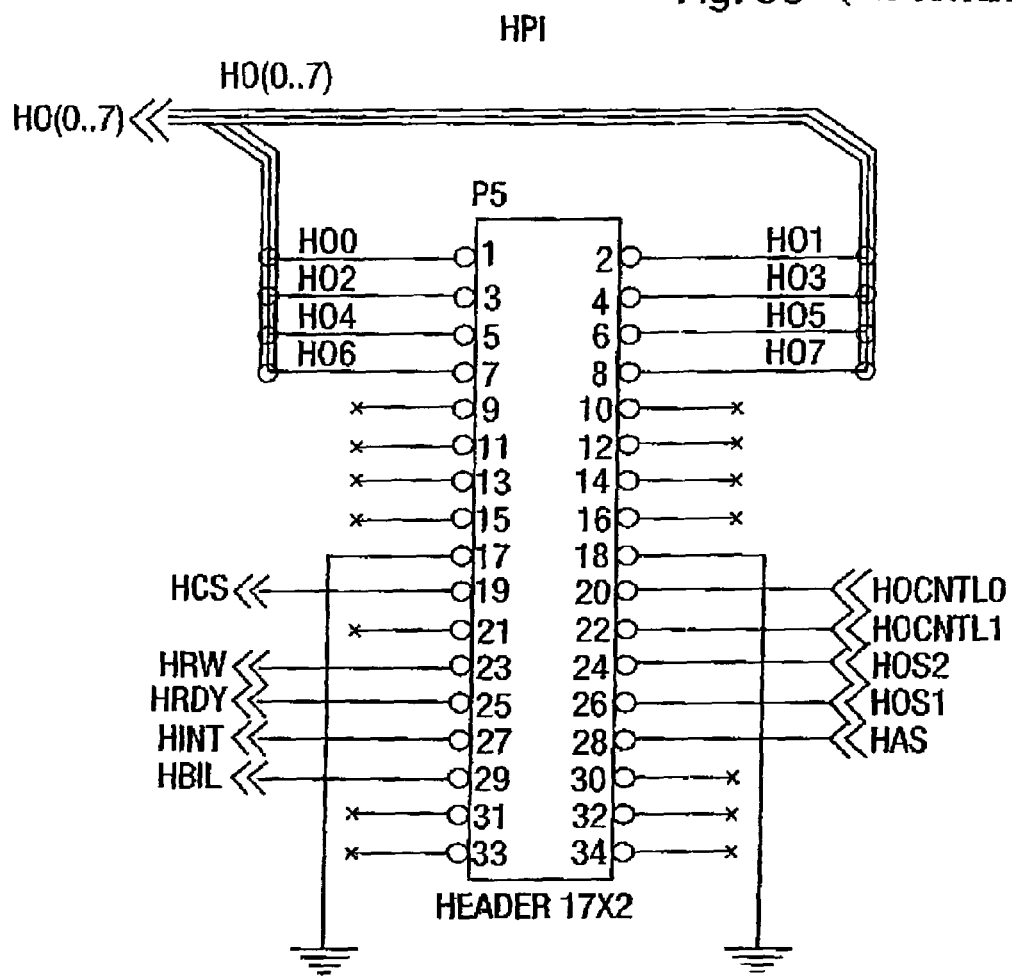
Figure 6D:
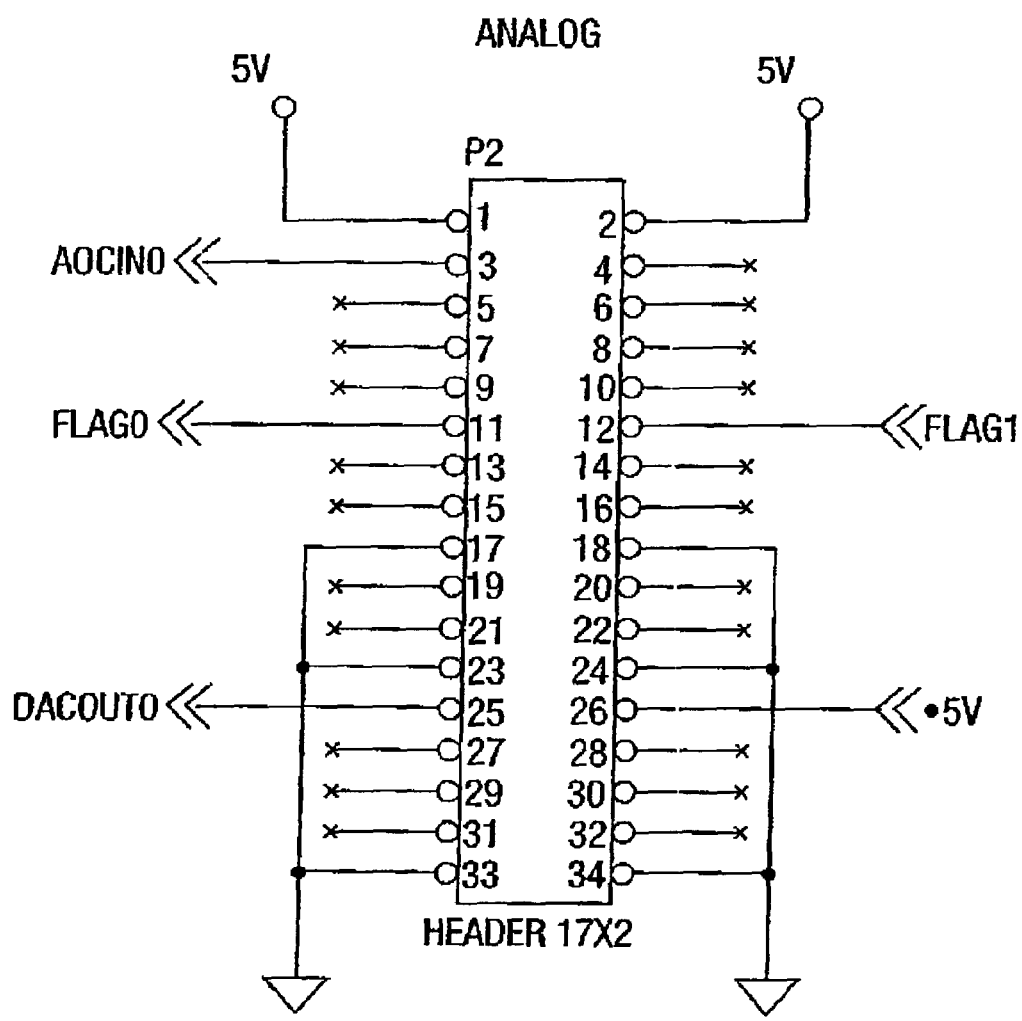
Figure 6E:
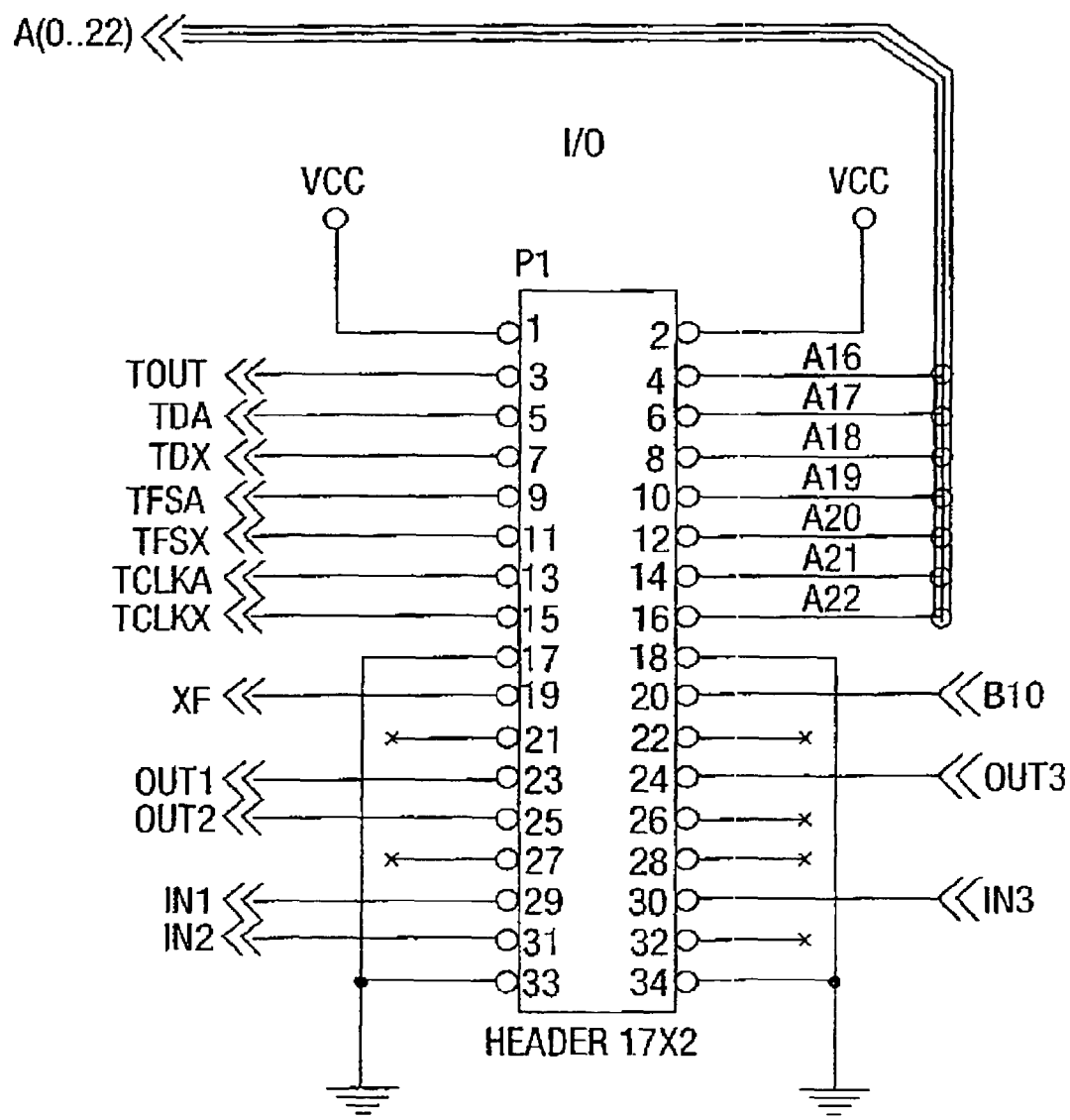

Referring to the drawings, in particular to FIG. 1, a workstation 1 is connected to a TMS470 processor evaluation module 3 by a software emulator cable 5. The cable 5 connects to the TMS470 module 3 at a Jtag connector 7 on the module 3. Also on the TMS470 module 3, are connectors JP1 and JP2. These connectors connect to signal lines of the TMS470 module 3 as shown in FIG. 5. The workstation 1 is able to control the TMS470 module so that software developed for the actual TMS470 processor on the ASIC can be executed, controlled and monitored. A description of the TMS470 processor evaluation module 3 is enclosed in the appendix. Using a TMS470 processor evaluation model module 3 with a workstation to develop and test software for TMS470 processor it is well known to those of ordinary skill in the art and therefore no further explanation of the TMS470 processor evaluation module, or its operation is necessary.

A TMS320 processor evaluation module 9 is also provided. This TMS320 module also has a Jtag connector 11 on the module 9 for connection to an emulator cable and then to a workstation. However, according to the present invention, no separate emulator cable for the TMS320 evaluation module 9 is needed. Details of the TMS320 processor evaluation module are described in the technical reference manual enclosed in the appendix of this application. Operation of the TMS320 module 9 is well known to those of ordinary skill in the field of the present invention. Therefore no further description of unrelated module details, or the operation, of the TMS320 module are necessary.

The TMS320 processor evaluation module 9 has data lines, address lines and control lines as shown in FIG. 6. The TMS320 processor is also known as a digital signal processor (DSP).

The present invention places the header portion of a connector on the TMS320 processor module 9. This allows a TMS320 cable 13 to be connected to the data lines, address lines and control lines of the Host Port Interface (HPI) of the TMS320 module 9 as shown in FIG. 6.

Figure 2A:
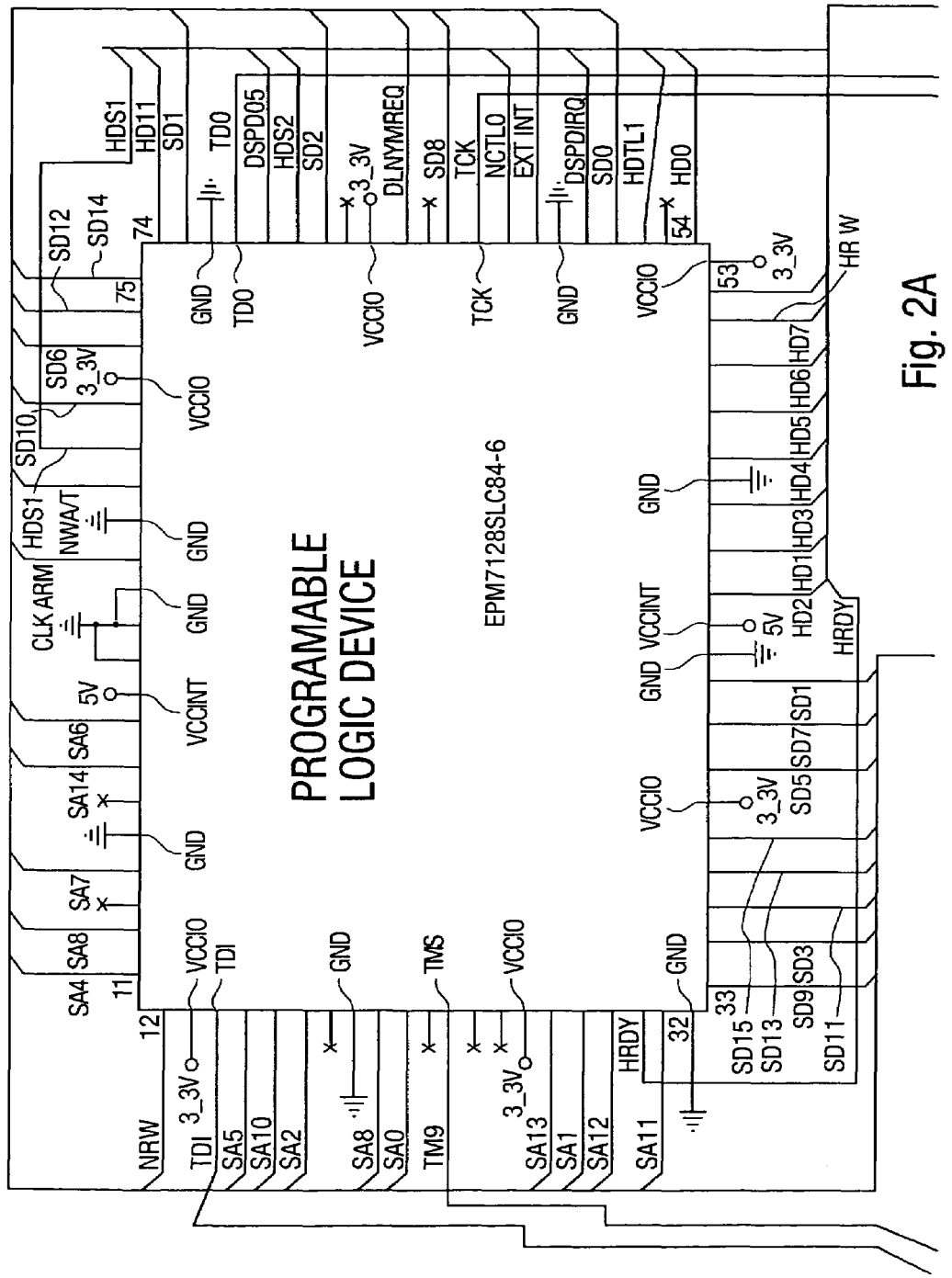
FIG. 2 is a schematic diagram of the logic components and connections on the bridge board.
Figure 2B:
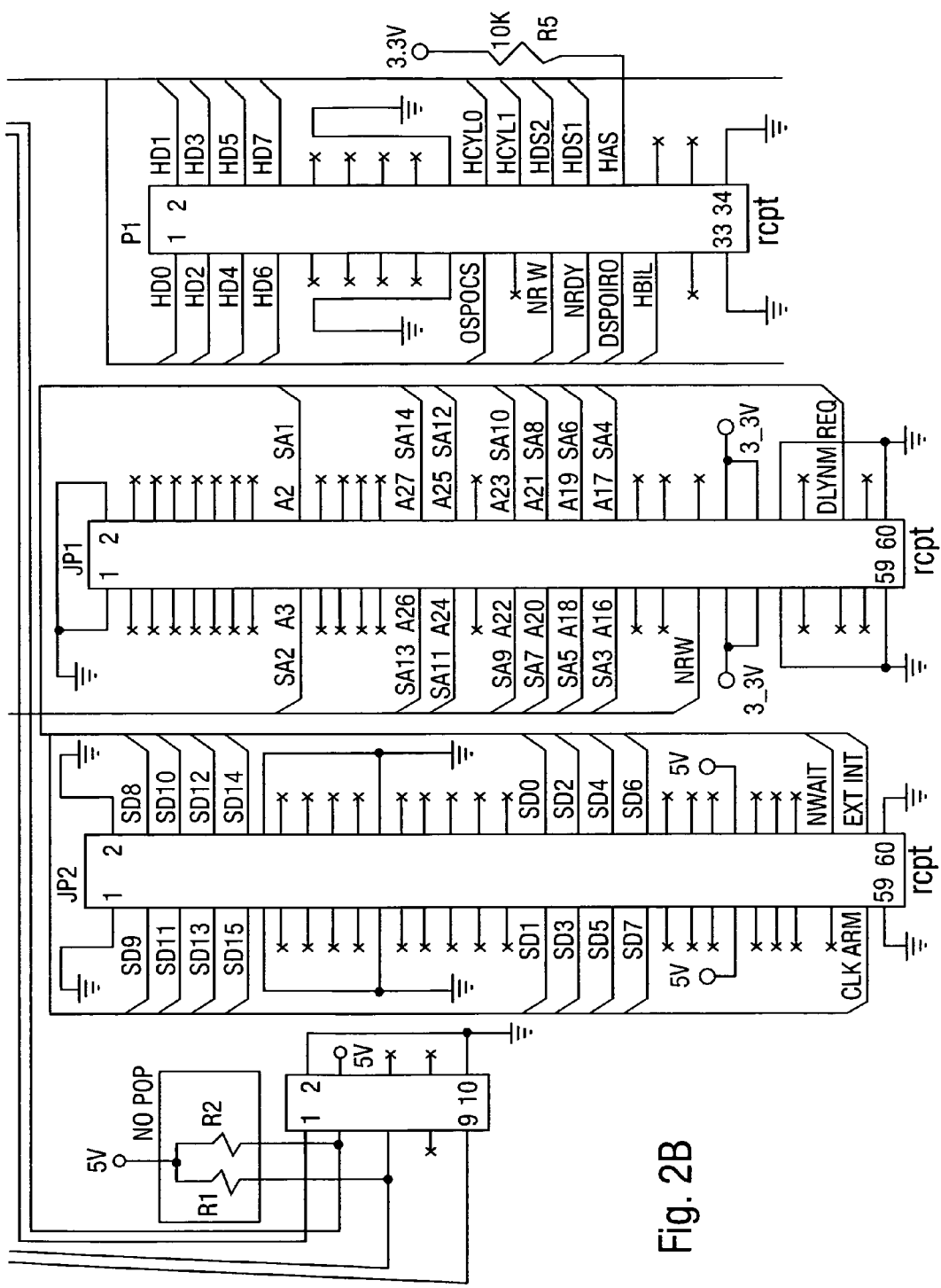

The bridge board 15 has a connector P1 which attaches to the TMS320 cable 13. FIG. 2 shows the connector P1 and the signals which connector P1 receives from the TMS320 module 9 over the TMS320 cable 13. The TMS320 cable 13 is preferably a 34 pin ribbon cable. The TMS470 cable 17 has connector ends for connecting to double row 1.27 connectors with 60 pins each. The bridge board 15 also has connectors JP1 and JP2 which connect via TMS470 cables 17 to the respective connectors JP1 and JP2 of the TMS470 module 3. In an alternative, the bridge board 15 could directly connect to the TMS470 module 3 without any cables in a "sandwich" fashion. The connectors in one board pop directly to the ones in the other board.

In the preferred embodiment, the TMS320 cable connects to the TMS320 module signal lines that are associated with a host port interface (HPI) and is part of the actual TMS320 processor on an ASIC. The signal line connections used by the bridge board 15 on the TMS470 module 3 and the TMS320 module 9 are typically used to monitor status of the individual lines of the processors during operation of different ASIC software programs running on the respective modules.

The bridge board 15 includes a Programmable Logic Device (PLD), preferably an Altera PLD of the MAX 7000 device family, model EPM7128SLC84-6 and the June 1996 ver. 4., the data sheet of which is attached in the appendix.

The PLD is connected to the JP1, JP2 and P1 connectors as shown in FIG. 2. The PLD runs its own software program which translates signals from the TMS470 module 3 into a format that can be used by the TMS320 module 9, and vice versa. The program uses the control signals and the address signals from each board to detect when one board has data to transfer to another board, and when each board is able to receive data, and when to indicate to a board that there is data to be received. An example of a software program for the Altera CPLD is enclosed in the appendix with the title "ARM_HPI". By the bridge board 15 being connected to the TMS470 processor module 3 and the TMS320 processor module 9, software engineers can begin the code development for an ASIC before the ASIC is actually created or, even possibly before the design is completely finished. The software engineers can include software code for the TMS470 module that will also control the TMS320 module by writing to the HPI port of the TMS320 module 9 through the bridge board 15. Only one software cable 5 is now needed to be connected to the TMS470 module 3 instead of separate cables for each of the modules 3 and 9. This provides the software engineers with a software environment that is very similar to the finished ASIC and allows the software engineers to start the software development at an early stage.

Figure 3:
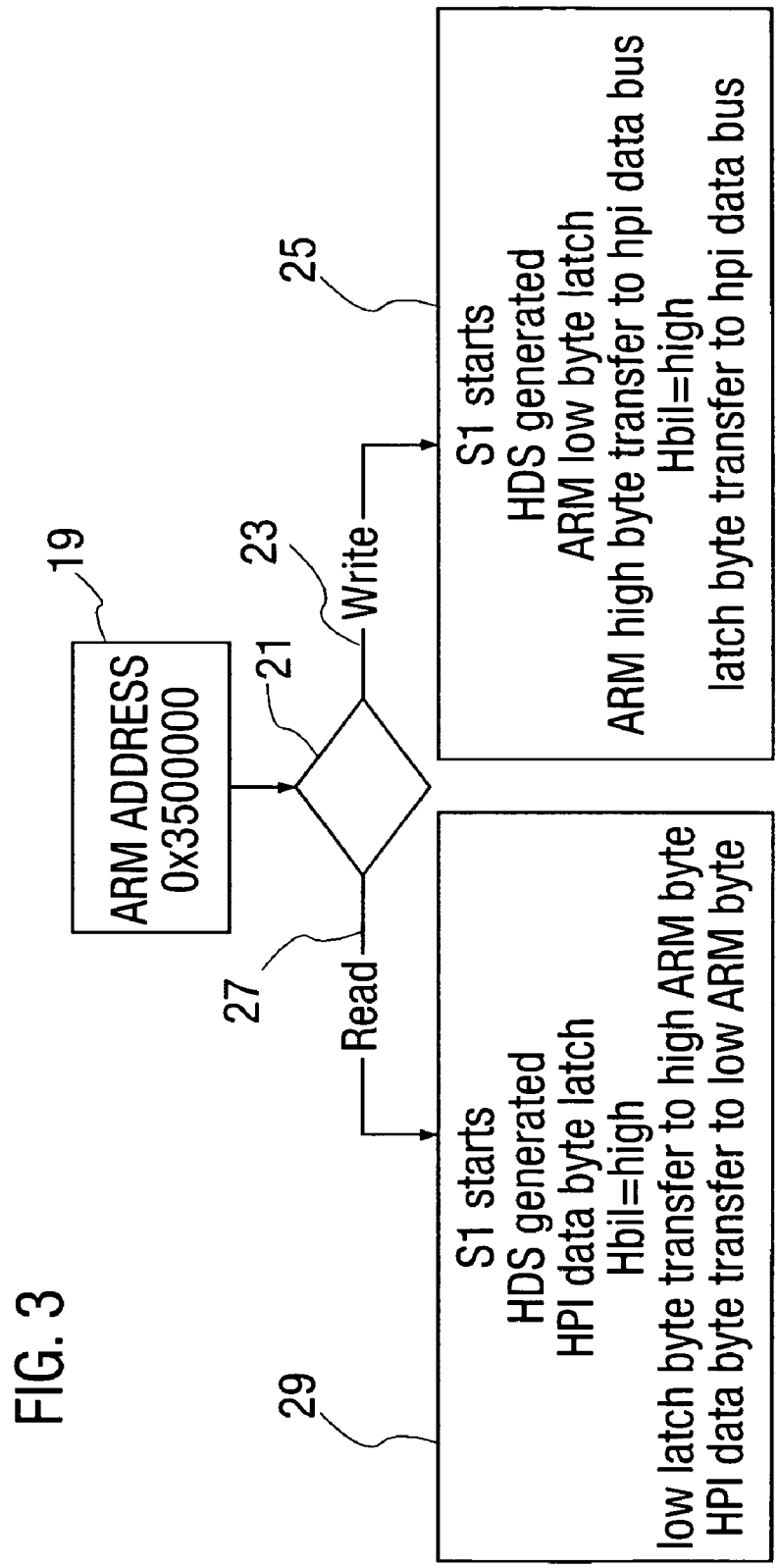
FIG. 3 is a flow chart of the operations performed in the bridge board for converting the signals between the two processor evaluation modules.
Figure 4:
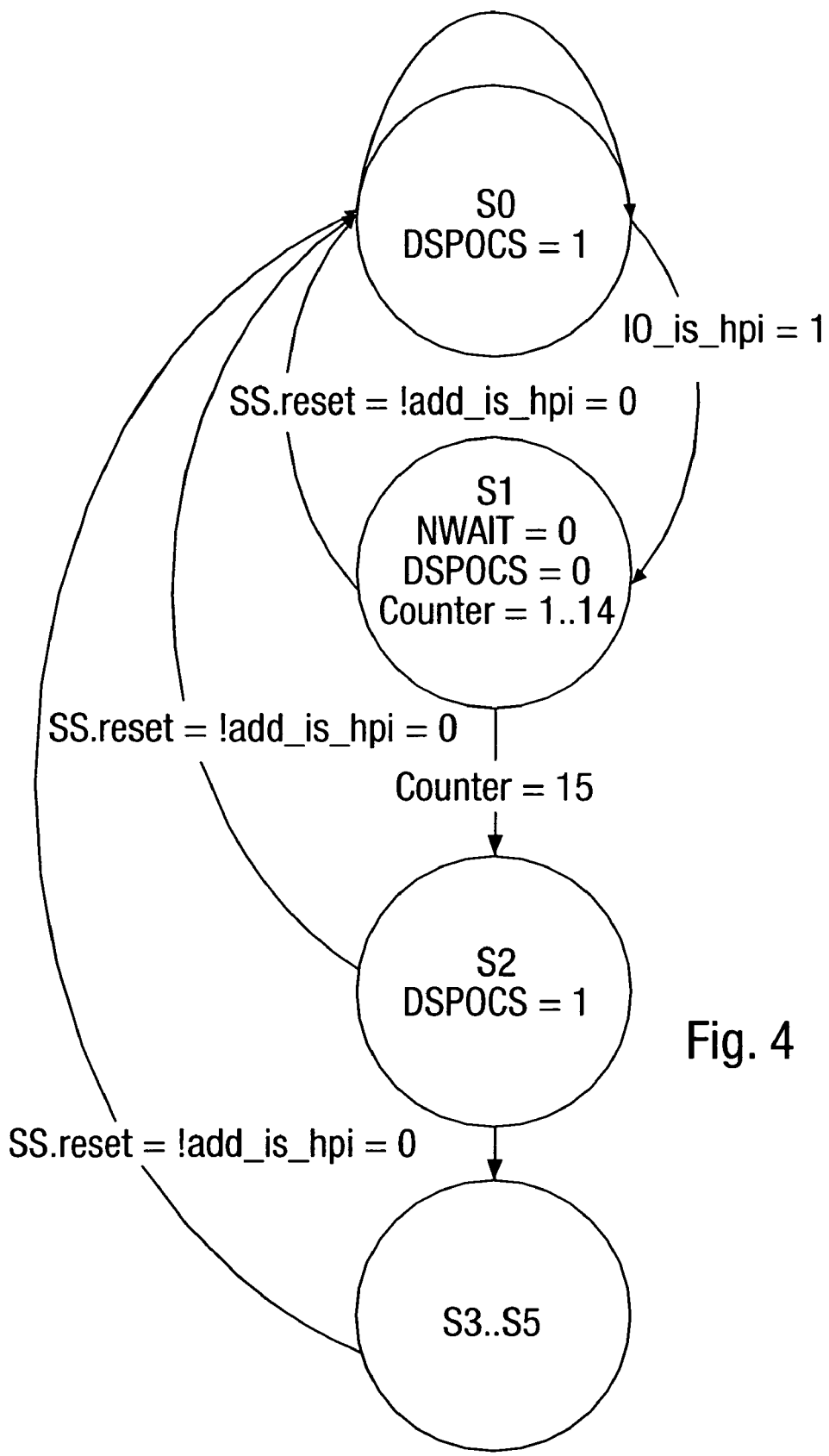
FIG. 4 is a state diagram of the operations performed in the bridge board for converting the signals between the two processor evaluation modules.

During operation of the invention, the PLD and software program will be enabled when the TMS470 module 3 writes or reads to/from Address 0x3500000 as shown in FIG. 3 by reference numeral 19. The PLD then performs a determination 21 as to whether the action at memory address 19 is a read or write. If the TMS470 module 3 is performing a write 23, the state machine of the PLD as shown in FIG. 4 starts, and the necessary control signals are generated 25. The PLD will take all 16 bits of the TMS470 module 3 data bus, latch the lower 8, transfer the high byte to the HPI data bus of the TMS320 module 9, set HBIL signal to high, then transfer the latched lower byte data to the BPI data bus.

If TMS470 module 3 is performing a read 27, the state machine starts and the necessary control signals are generated 29. The PLD will take the data from the HPI data bus, and will latch this data, then set Hbil High, and will then get the other 8 bits from the HPI data bus. The PLD will then place all 16 bits (including the first 8 bits that were latched) to the higher data bits and the last 8 bits from the HPI to the lower TMS470 module 3 data bits.

While specific embodiments of the invention have been shown and described in detail to illustrate the application of the principles of the invention, it will be understood that the invention may be embodied otherwise without departing from such principles.

What is claimed is:

1. An emulating interface arrangement for a processor evaluation board and a DSP evaluation board, the processor evaluation board having a connector corresponding to actual data lines, address lines and control lines of the processor evaluation board, the DSP evaluation board having a connector corresponding to actual data lines, address lines and control lines of a DSP emulated by the DSP evaluation board, the arrangement comprising:
    a bridge board;
    a processor connection extending from said bridge board for connecting to the connector of the processor evaluation board;
    a Digital Signal Processor (DSP) connection extending from said bridge board for connecting to the connector of the DSP evaluation board;
    a Programmable Logic Device (PLD) mounted on said bridge board and electrically connected to both said processor connection and said DSP connection;
    software included in said PLD for reading said address lines, said data lines and said control lines of said processor connection and said DSP connection, said software monitoring said lines and converting signals from said address lines, data lines and control lines of said processor connection into DSP transfer signals based on signals received from said DSP connection, said software transmitting said DSP transfer signals to said DSP connection, said software converting signals from said address lines, said data lines and said control lines of said DSP connection into processor transfer signals based on signals received from said processor connection, said software transmitting said processor transfer signals to said processor connection, wherein said bridge board with said PLD and said software emulate a physical and electrical connection between a processor and a DSP in an Application Specific Integrated Circuit (ASIC).

2. An emulating interface arrangement in accordance with claim 1, wherein:
    one of said processor connection and said DSP connection is connectable to a power line of a respective processor evaluation board and a DSP evaluation board;
    said PLD is powered from said one connection being connected to the power line.

3. An emulating interface arrangement in accordance with claim 1, wherein:
    said processor connection is formed for connecting to a Spectrum Digital Incorporated TMS470 evaluation board;
    said DSP connection is formed for connecting to a Spectrum Digital Incorporated TMS320LC54X evaluation board.

4. An emulating interface arrangement in accordance with claim 3, wherein:
    said processor connection has structure to connect to JP1 and JP2 connectors of the Spectrum Digital Incorporated TMS470 evaluation board.

5. An emulating interface arrangement in accordance with claim 1, wherein:
    said DSP connection includes a header to connect to conductive paths of the DSP evaluation board.

6. An emulating interface arrangement in accordance with claim 5, wherein:
    said header is connectable to said conductive paths that correspond to a Host Port Interface (HPI) of the DSP evaluation board.

7. An emulating interface arrangement for a processor evaluation board and a DSP evaluation board, the processor evaluation board having a connector corresponding to actual data lines, address lines and control lines of a processor emulated by the processor evaluation board, the DSP evaluation board having a connector corresponding to actual data lines, address lines and control lines of a DSP emulated by the DSP evaluation board, the arrangement comprising:
    a bridge board;
    a processor connection extending from said bridge board for connecting to the connector of the processor evaluation board;
    a Digital Signal Processor (DSP) connection extending from said bridge board for connecting to the connector of the DSP evaluation board;
    a Programmable Logic Device (PLD) mounted on said bridge board and electrically connected to both said processor connection and said DSP connection;
    software included in said PLD for reading said address lines, said data lines and said control lines of said processor connection and said DSP connection, said software monitoring said lines and converting signals from said address lines, data lines and control lines of said processor connection into DSP transfer signals based on signals received from said DSP connection, said software transmitting said DSP transfer signals to said DSP connection, said software converting signals from said address lines, said data lines and said control lines of said DSP connection into processor transfer signals based on signals received from said processor connection, said software transmitting said processor transfer signals to said processor connection, wherein: said control lines include an interrupt line, a wait line, and a clock line.

8. An emulating interface arrangement for a processor evaluation board and a DSP evaluation board, the processor evaluation board having a connector corresponding to actual data lines, address lines and control lines of a processor emulated by the processor evaluation board, the DSP evaluation board having a connector corresponding to actual data line, address lines and control lines of a DSP emulated by the DSP evaluation board, the arrangement comprising:
    a bridge board;
    a processor connection extending from said bridge board for connecting to the connector of the processor evaluation board;
    a Digital Signal Processor (DSP) connection extending from said bridge board for connecting to the connector of the DSP evaluation board;
    a Programmable Logic Device (PLD) mounted on said bridge board and electrically connected to both said processor connection and said DSP connection;

software included in said PLD for reading said address lines, said data lines and said control lines of said processor connection and said DSP connection, said software monitoring said lines and converting signals from said address lines, data lines and control lines of said processor connection into DSP transfer signals based on signals received from said DSP connection, said software transmitting said DSP transfer signals to said DSP connection, said software converting signals from said address lines, said data lines and said control lines of said DSP connection into processor transfer signals based on signals received from said processor connection, said software transmitting said processor transfer signals to said processor connection, a processor evaluation board connected to said processor connection, said processor evaluation board emulating the operation of a processor;

a DSP evaluation board connected to said DSP connection, said DSP evaluation board emulating the operation of a DSP.

9. An emulating interface arrangement in accordance with claim 8, further comprising:

a workstation connected to one of said processor evaluation board and said DSP evaluation board for configuring both of said processor evaluation board and said DSP evaluation board.

10. An emulating interface arrangement in accordance with claim 8, wherein:

said processor evaluation board and said DSP evaluation board include JTAG connectors for connecting to workstations which configure said processor evaluation board and said DSP evaluation board.

11. An emulating interface arrangement in accordance with claim 8, wherein:

said processor evaluation board, said bridge board and said DSP evaluation board emulate an ASIC with a processor connected to a DSP.

12. An emulating interface arrangement in accordance with claim 8, further comprising:

a power contact in one of said processor connection and said DSP connection for powering said bridge board with power from a respective one of said processor evaluation board and said DSP evaluation board.

13. An emulating interface arrangement in accordance with claim 8, wherein:

said processor emulation board is a Spectrum Digital Incorporated TMS470 evaluation board;

said DSP emulation board is a Spectrum Digital Incorporated TMS320LC54X evaluation board.

14. An emulating interface arrangement in accordance with claim 13, wherein:

said processor connection has structure to connect to JP1 and JP2 connectors of said Spectrum Digital Incorporated TMS470 evaluation board.

15. An emulating interface arrangement in accordance with claim 13, wherein:

said DSP connection includes a header to connect to conductive paths of said Spectrum Digital Incorporated TMS320LC54X evaluation board.

16. An emulating interface arrangement in accordance with claim 15, wherein;

said header is connectable to said conductive paths that correspond to a Host Port Interface (HPI) of the DSP evaluation board.

17. An ASIC software emulator arrangement comprising:

a TMS320 evaluation board with signal lines corresponding to actual signal lines of TMS320 processor, said TMS320 evaluation board transferring data through said signal lines in a DSP format;

a TMS470 evaluation board with signal lines corresponding to actual signal lines of TMS470 processor, said TMS470 evaluation board transferring data in a processor format;

a bridge board connected to said sigal lines of said TMS470 evaluation board and said TMS320 evaluation board, said bridge board converting data in said processor format on said TMS470 evaluation board into DSP format and onto said TMS320 evaluation board, said bridge board also converting data in said DSP format on said TMS320 evaluation board into said processor format and onto said TMS470 evaluation board.

* * * * *